US007634656B2

(12) United States Patent
Pearson

(10) Patent No.: US 7,634,656 B2
(45) Date of Patent: Dec. 15, 2009

(54) METHOD AND APPARATUS FOR IDENTIFYING A VOICE CALLER

(75) Inventor: Siani Lynne Pearson, Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 1514 days.

(21) Appl. No.: 10/241,894

(22) Filed: Sep. 12, 2002

(65) Prior Publication Data

US 2003/0051133 A1 Mar. 13, 2003

(30) Foreign Application Priority Data

Sep. 13, 2001 (GB) ................................ 0122045.8

(51) Int. Cl.
*H04L 9/32* (2006.01)
(52) U.S. Cl. .................... 713/168; 713/177; 455/412.1; 455/412.2; 455/415; 379/142.04
(58) Field of Classification Search ................ 713/168, 713/177; 379/69–70, 88.01, 88.02, 88.03, 379/207.13, 207.14, 67.1, 199, 355.04, 74, 379/211.02, 201.02, 142.01, 127.01, 142.15, 379/900, 132.04; 455/415, 412.1–2, 412.2; 705/74; 370/328, 356, 352; 380/257
See application file for complete search history.

(56) References Cited

U.S. PATENT DOCUMENTS

| | | | | |
|---|---|---|---|---|
| 5,289,542 | A * | 2/1994 | Kessler .................... | 380/257 |
| 5,361,359 | A | 11/1994 | Tajalli et al. ................ | 395/700 |
| 5,701,339 | A * | 12/1997 | Suda ......................... | 379/67.1 |
| 5,724,412 | A | 3/1998 | Srinivasan ............... | 379/93.23 |
| 6,330,670 | B1 | 12/2001 | England et al. ................ | 713/2 |
| 6,421,439 | B1 * | 7/2002 | Liffick .................... | 379/211.02 |
| 6,631,182 | B1 * | 10/2003 | Schwab et al. ........... | 379/88.19 |
| 6,769,060 | B1 * | 7/2004 | Dent et al. .................. | 713/168 |
| 2001/0034718 | A1 * | 10/2001 | Shaked et al. ................ | 705/64 |

FOREIGN PATENT DOCUMENTS

| | | |
|---|---|---|
| GB | 2 340 340 A | 2/2000 |
| WO | WO 01/54346 A1 * | 7/2001 |

OTHER PUBLICATIONS

"Building a Foundation of Trust in the PC," *The Trusted Computing Platform Alliance*, Jan. 2000.
"Information technology—Security techniques—Entity authentication—Part 3: Mechanisms using digital signature techniques," *ISO/IEC 9798-3*, Second Edition, 1998.

(Continued)

*Primary Examiner*—Thanhnga B Truong

(57) ABSTRACT

A voice call system and a method and apparatus for identifying a voice caller are disclosed. The system includes a call originator apparatus 10 and a called party apparatus 20. At least one trusted user identity is formed at the call originator apparatus 10, ideally in a trusted platform module 12 configured according to a Trusted Computing Platform Alliance (TCPA) specification. The called party apparatus 20 checks the trusted user identity when establishing a new voice call. Advantageously, an identity of the voice caller using the call originator apparatus is confirmed in a reliable and trustworthy manner, even when the voice call is transported over an inherently insecure medium, e.g. an open computing system like the internet 30. Preferred embodiments of the invention use IP telephony, such as SIP (session initiation protocol) or H.323 standard voice telephony.

5 Claims, 3 Drawing Sheets

OTHER PUBLICATIONS

"Information technology—Security techniques—Key management—Part 3: Mechanisms using asymmetric techniques," *ISO/IEC 11770-3*, 1999.

*Trusted Computing Platform Alliance (TCPA) Main Specification*, Version 1.0, Jan. 25, 2001.

Yee, B., "Using Secure Coprocessors," Doctoral Thesis, May 1994. Internet: <http://softarmor.com/sipwg/drafts/morgue/draft/dcsgrp-sip-privacy-00.txt> Visited: Mar. 27, 2002.

Internet: <http://www.trustedpc.org/home/home.htm> Visited: Mar. 26, 2002.

"Human Factors (HF); User Identification Solutions in Converging Networks," *ETSI Technical Committee Human Factors (HF)*, ETSI Guide EG 201 940, V1.1.1 (Jan. 31, 2001).

Ramakrishnan, K., et al., *SIP Working Group: Internet Draft*, Internet: <http://www.softarmor.com/sipwg/drafts/morgue/draft-dcgroup-sip-privacy-00.txt> (Jun. 12, 2003).

* cited by examiner

METHOD AND APPARATUS FOR IDENTIFYING A VOICE CALLER

FIELD OF THE INVENTION

The present invention relates in general to a method and apparatus for identifying a voice caller to a called party.

Description of the Related Art

Fixed-line telecommunications networks have developed systems for identifying a caller to a called party, commonly known as "caller display". Typically, information about the caller is formed within the exchange infrastructure of the fixed-line network, and hence is relatively difficult to subvert. Therefore, the called party trusts the caller display information provided in a fixed-line network. More recently, caller display functions are provided in cellular telecommunications networks, such as GSM networks. In a cellular network a user handset originating a call provides information to establish the identity of that handset, which can then be used to form caller display information. Again, subversion is relatively difficult and the called party trusts the caller display information.

A problem arises when it is desired to provide reliable caller display information in other forms of networks. As one example, an open computing network such as the internet does not have an infrastructure to provide trusted caller display information. Voice calls can be established using systems such as IP telephony or net-conferencing, and there is a need for a called party to establish the identity of a call originator in a trustworthy and reliable manner. For example, it is desired to identify a voice caller in a manner that inhibits subversion, such as by impersonation of the voice caller.

SUMMARY OF THE INVENTION

An aim of the present invention is to provide a voice call system, and a method and apparatus for identifying a voice caller, that is reliable and trustworthy. A preferred aim is to provide a method and apparatus for identifying a voice caller of a call originating apparatus to a called party at a called party apparatus, such as in an IP (Internet Protocol) telephony system.

According to a first aspect of the present invention there is provided a method for identifying a voice caller in a voice call network including a call originating apparatus and a called party apparatus, the method comprising the steps of: forming a trusted user identity comprising an identity label and a cryptographically generated identity key; initiating a voice call; and providing the trusted user identity from the call originating apparatus to the called party apparatus.

Preferably, the method of this first aspect of the invention is performed at a user apparatus that acts as a call originator apparatus. The method is particularly suitable for use in an open computer network adapted to carry voice data. As one example, voice data is carried by way of IP telephony, using packets of digital data.

Preferably, the step of forming a user identity comprises forming a trusted user identity. Conveniently, the trusted user identity is a cryptographic identity, preferably formed using an asymmetric encryption algorithm. As one example, a RSA algorithm (of the type designed by Rivest, Shamir and Adleman) is used to form a private identity key and public identity key pair. The public identity key is associated with a text label, and a certificate is formed which is signed by a trusted third party. Ideally, the trusted user identity is formed under a TCPA protocol defined by the Trusted Computing Platform Alliance, in which case the trusted third party is termed a privacy certifying authority. The trusted user identity allows an enquirer to trust the accuracy and reliability of the user identity.

In a first option, the user identity relates to the user's real identity. For example, a text label contains the user's real name. In another option, the user identity is anonymous and does not reveal the user's real identity. Only a trusted third party such as the privacy certifying authority knows an association between real and anonymous user identities. Preferably, the user identity is an anonymous trusted user identity, which allows an enquirer to trust that the user provides accurate and reliably identity information, without revealing the user's real identity.

Optionally, a plurality of user identities are formed, such that a different identity is used in different contexts, or different identities are used at different times in the same context.

Optionally, the trusted user identity is associated with personal details of the call originating user. These personal details include, for example, contact information similar to a traditional paper business card, such as a mailing address, an email address, or telephone and fax numbers. Where the user wishes to remain anonymous, conveniently the contact details are given for a third party message transfer agent.

According to the second aspect of the present invention there is provided a method for identifying a voice caller, for use in a computing network arranged to carry a voice call from a call originating apparatus to a called party apparatus, the method comprising the steps of: forming a user identity at the call originating apparatus, the user identity being a cryptographic identity according to an encryption algorithm; and initiating a IP telephony voice call, including supplying the user identity from the call originating apparatus to the called party apparatus.

The user identity is preferably formed using an asymmetric encryption algorithm. Preferably, the method comprises creating a public key and private key pair, retaining the private key at the call originating apparatus, and supplying the public key to the called party apparatus in the user identity.

Further, the method preferably includes steps that are performed at a user apparatus that acts as the called party apparatus. That is, the called party apparatus receives the incoming voice call from the call originator, and receives the trusted user identity that has been formed as discussed above.

Preferably, the method comprises cryptographically checking the user identity at the called party apparatus. The called party apparatus preferably checks the public key of the user identity, by interrogating the call originating apparatus to confirm that the call originating apparatus retains the corresponding private key. Since only the genuine call originating apparatus validly retains the private key, this interrogation allows the called party apparatus to identify the voice caller with a high degree of trust.

Preferably, the method includes indicating a successful or unsuccessful result of the cryptographic check at the called party apparatus.

In one preferred embodiment, the step of forming a user identity includes obtaining a signature from a privacy certifying authority. Preferably, the method comprises checking the signature at the called party apparatus using a signature checking key.

Optionally, the method includes the step of displaying information based on the trusted user identity to a user at the called party. Suitably, the called party displays the text label provided in the trusted user identity such that a user of the called party apparatus can recognise the identity of a call originator.

Advantageously, the use of trusted user identities allows a called party to trust identity information supplied by a call originator, even when a voice call is made across an inherently insecure network such as an open computing network like the internet. Subversion such as by impersonation of the voice caller from another user apparatus is significantly inhibited.

According to a third aspect of the present invention there is provided a call originating user apparatus arranged to originate a voice call over a computing network to a called party apparatus, the call originating user apparatus comprising: a call unit arranged to initiate a voice call over the computing network; and an identity unit arranged to form a cryptographic user identity, and to provide the cryptographic user identity to the called party apparatus.

Preferably, the identity unit is arranged to form a trusted user identity comprising an identity label and a public identity key, the public identity key being formed as one part of an asymmetric encryption algorithm. The user identity may comprise a signature obtained from a privacy certifying authority. Ideally, the identity unit comprises a TCPA trusted platform module.

According to a fourth aspect of the present invention there is provided a called party user apparatus arranged to receive a voice call from a call originating apparatus across a computing network, the called party user apparatus comprising: a call unit arranged to receive an incoming voice call that includes a cryptographically-formed user identity; and a check unit arranged to cryptographically check the user identity to identify a voice caller.

Preferably, the check unit is arranged to make a challenge to the call originator apparatus, and in return receive a signed response.

In the preferred embodiment, the user identity comprises a user identity label, a public identity key, and a third-party signature, and the check unit is arranged to check the third-party signature using a signature checking key, cryptographically check the public identity key by interrogating the call originating apparatus, and then identify a voice caller with the user identity label.

According to a fifth aspect of the present invention there is provided a voice call system for use in IP telephony, the system comprising: a call originator apparatus adapted to form and send a cryptographic caller identity that includes an identity label and a public identity key, the public identity key being one part of a public key and private key encryption; and a called party apparatus arranged to receive and check the caller identity, using the public key.

Preferably, the call originator apparatus and the called party apparatus are each arranged to communicate by IP telephony. Preferably, the call originator apparatus and the called party apparatus are each arranged to communicate by Session Initiation Protocol or H.323 standard IP telephony.

BRIEF DESCRIPTION OF THE DRAWINGS

For a better understanding of the invention, and to show how embodiments of the same may be carried into effect, reference will now be made, by way of example, to the accompanying diagrammatic drawings in which.

DESCRIPTION OF THE PREFERRED EMBODIMENT

The preferred embodiments of the present invention will be described with reference to the example voice call system shown in FIG. 1. A call originator apparatus 10 is arranged to originate a voice call to a called party apparatus 20. The call originator apparatus and the called party apparatus are each suitably user apparatus. Preferably, a single user apparatus is able to function both as a call originator apparatus and as a called party apparatus, so as to both originate and receive voice calls.

The call originator apparatus 10 and the called party apparatus 20 are each preferably combined voice and data devices. Any suitable form factor can be employed. In one embodiment the apparatus are each a relatively portable device, such as a cellular telephone handset, a personal digital assistant, a laptop computer or a palmtop computer. In another embodiment, each apparatus is a relatively static device such as a desktop computer. Suitably, each apparatus comprises a user interface including, for example, a microphone and speaker for voice communication, and optionally a display such as a text display or screen.

Figure 1:
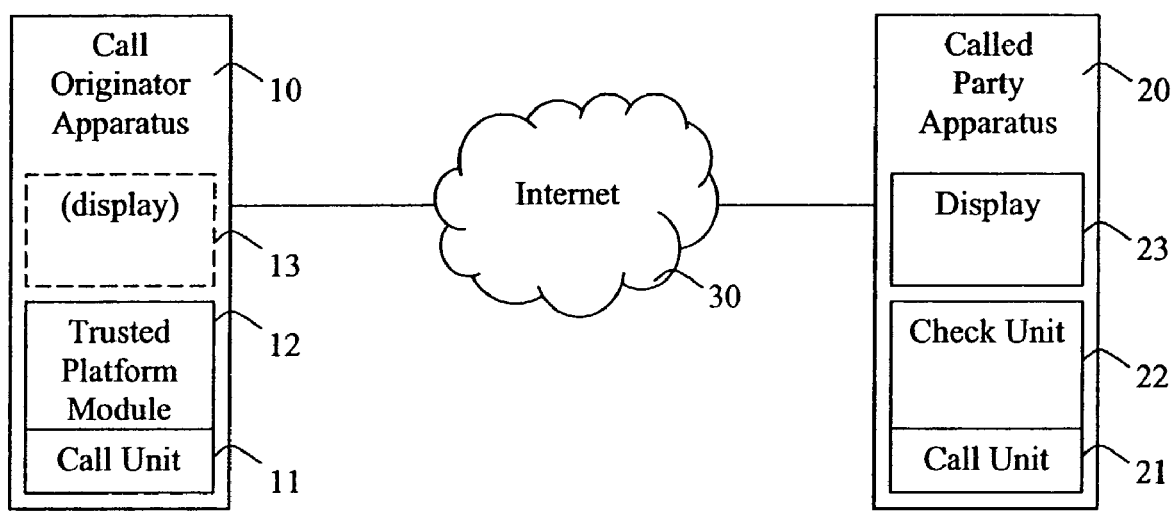
FIG. 1 shows a preferred voice call system including call originator apparatus and called party apparatus.

As shown in FIG. 1, in an example embodiment the call originator apparatus 10 and the called party apparatus 20 are each members of an open computing network such as the internet 30. The preferred voice call system employs IP (internet protocol) telephony, using packet-switched data communications to carry digital data representing speech or other audio signals. Here, IP telephony is contrasted with more traditional voice call systems, such as a public switched telephone network (PSTN), that provide dedicated circuit switched connections between call parties.

The call originator apparatus 10 in the preferred embodiment comprises a call unit 11 for handling voice calls, and optionally a display 13 is provided as part of a user interface. A trusted platform module 12 is arranged to form and provide at least one trusted user identity, which is used to provide a reliable and trustworthy caller identity.

The called party apparatus likewise comprises a call unit 21 for handling voice calls, and a display 23 as part of a user interface. Also, the called party apparatus comprises a check unit 12 arranged to check a received caller identity.

Each call unit 11, 21 is configured appropriate to a transport mechanism selected to carry the voice call. Several different specific forms of IP telephony are available, and each may be employed in preferred embodiments of the present invention. In particular, the present invention is applicable to both SIP (Session Initiation Protocol) telephony, and H.323 standard telephony. In either case, the call originator apparatus 10 and the called party apparatus 20 are suitably end points of a computing network, which comprises many intermediate gateways and agents. As one example, in an SIP telephony system the calling party apparatus 10 and called party apparatus 20 each act as a SIP user agent, each associated with a local SIP proxy. The local SIP proxies themselves communicate through one or more intermediary SIP proxies. The preferred embodiments of the present invention allow a trusted caller identity to be formed at the calling party apparatus 10 and sent to the called party apparatus 20.

It is desired that the called party apparatus 20 is able to obtain reliable and trustworthy identity information, even though the called party apparatus 20 receives such information through many intermediaries. In practical situations, it is very difficult for the called party apparatus to trust each of those intermediaries. Further, it is desired to confirm that the voice caller themselves provides accurate and reliable identity information, that has not been corrupted or subverted.

The trusted platform module 12 allows enquiries to be made of the calling party apparatus 10 with a high degree of trust. More detailed background information concerning a trusted platform module suitable for use in the preferred embodiments of the invention is available from the Trusting Computing Platform Alliance at www.trustedpc.org. See, in particular, "TCPA Main Specification", version 1.0, dated 25 Jan. 2001.

In the presently preferred embodiments of the invention, the trusted platform module 12 comprises a trusted device. The trusted device is a hardware component such as an application specific integrated circuit (ASIC). Preferably, the trusted device is mounted within a tamper-resistant housing. The trusted device is coupled to other parts of the user apparatus and is suitably mounted on a motherboard of a main computing unit of the user apparatus.

The trusted platform module (TPM) 12 preferably performs many functions. One function of the trusted platform module is to form an integrity metric representing the status and condition of the user apparatus, or at least the status and condition of selected parts of the user apparatus. The integrity metric is made available to a challenging enquirer who can then confirm that the user apparatus is in a trusted status and condition, by comparing the integrity metric against expected values. Such a user apparatus is then trusted to operate in a reliable and expected manner. For example, a trusted computing platform is trusted not to be subject to subversion such as by a virus, or by an authorised access, or by replication or impersonation.

In the preferred embodiments of the invention, the trusted platform module 12 functions to provide one or more trusted identities, which are used to identify the user (owner) of the user apparatus 10 to a called party.

Under the TCPA specification, the process for forming a trusted user identity comprises the steps of (a) establishing credentials of the user apparatus, which allows an enquirer to trust the status and condition of the user apparatus as a trusted computing platform, and (b) supplying these user apparatus credentials to a third party (known as a Privacy Certifying Authority or Privacy-CA) who in return certifies the trusted user identity. The Privacy-CA uses the supplied user apparatus credentials to verify that the user apparatus is a trusted computing platform with a genuine TPM, and hence is willing to certify to an identity of that platform. Optionally, the Privacy-CA may also check the real identity of the user, such as by checking a passport, driving licence, or other paper or electronic identity documents.

The trusted user identity is formed as a certificate comprising an identity label and a public identity key, and the certificate is signed by the Privacy-CA. Here, the identity-key is a cryptographic identity. Suitably, the Privacy-CA attests to the user identity by creating a credential that binds the identity-key to the identity-label and information about characteristics of the user apparatus. That credential can be presented to other entities, and allows the user of the user apparatus to prove that the identity belongs to a genuine TPM. The user apparatus 10 (strictly the TPM 11) can have as many or as few of these identities as the user wishes. The or each trusted user identity is conveniently stored by the trusted platform module 11, such as in a secure memory within the trusted device.

Advantageously, only the Privacy-CA can collate the credentials, or trace them back to the user. A user may therefore choose a Privacy-CA whose polices meet the user's privacy requirements. The user can himself act as a Privacy-CA if the user has sufficient credibility.

In a particularly preferred embodiment, the trusted user identity is anonymous. Here, the identity-label is, for example, an arbitrary text character string that does not reveal the real identity of the user. Such an anonymous trusted user identity allows the user a greater degree of privacy and increases willingness of the user to provide the trusted user identity to a wide range of called parties. The anonymous trusted user identity allows the called party to trust that the caller is genuine, without needing to know the user's real identity.

Where the trusted platform module 12 supports a plurality of trusted user identities, and preferably a plurality of anonymous trusted user identities, one of these identities is selected when in an appropriate context. Here, the user is able to select one of many available identities each of which can be trusted by relevant called parties. Advantageously, the user can retain a high degree of anonymity, and it is difficult for called parties to combine any information about the call originating user. Optionally, the selection amongst available identities is automatically rotated in a predetermined pattern, or picked randomly or pseudo-randomly.

The check unit 22 of the called part apparatus 20 is arranged to check a trusted user identity supplied from the call originator apparatus 10. As mentioned above this is preferably a trusted user identity and optionally an anonymous trusted user identity.

The check unit 22 suitably informs a user of the called party apparatus of the result of the check. Optionally, where the check unit 22 is satisfied as to the accuracy of the trusted user identity, then information from the trusted user identity, such as the text identity label identifying the call originator, is displayed on the display 23 to be seen by a user of the called party apparatus.

Figure 2:
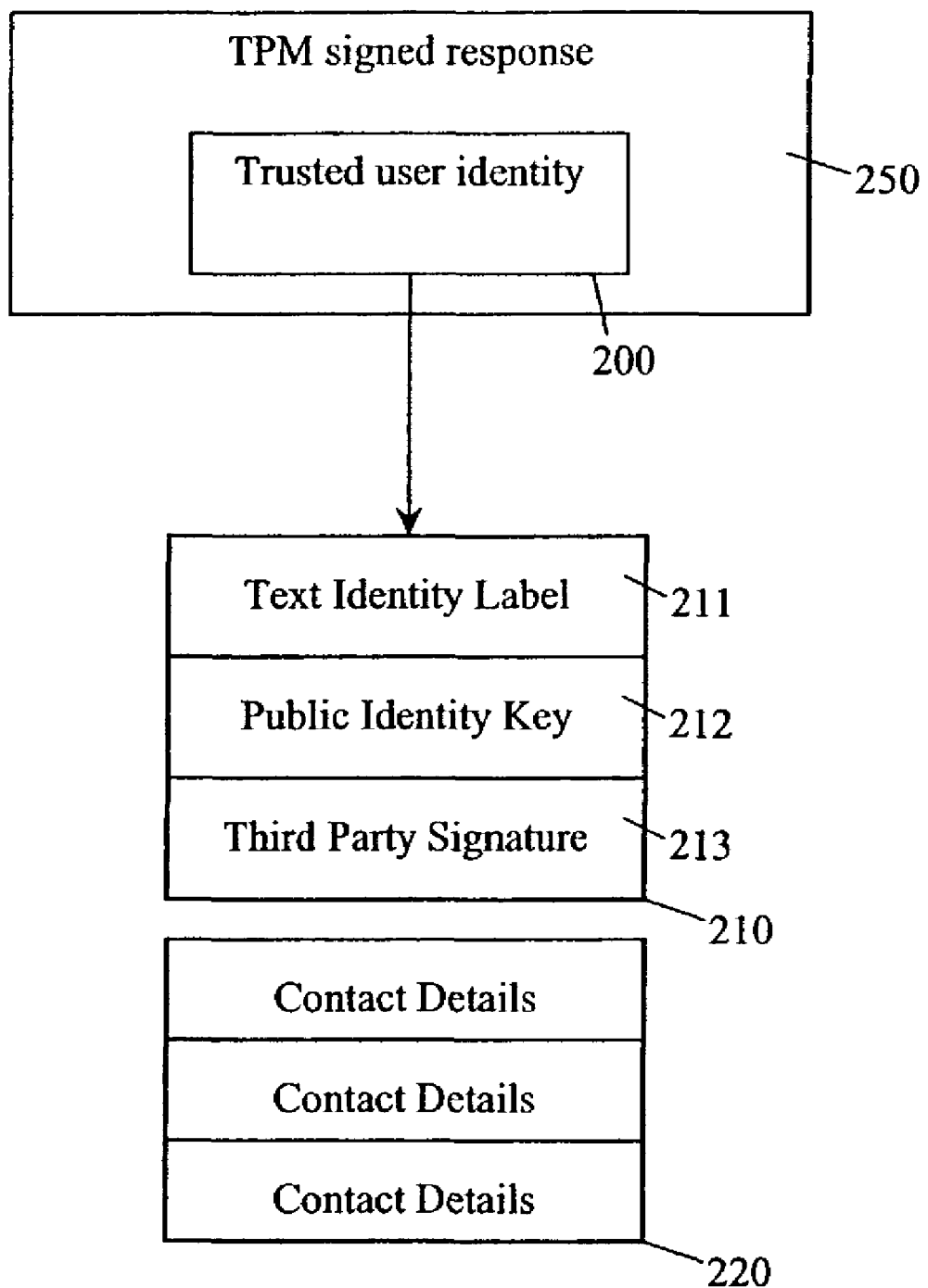
FIG. 2 shows an example trusted user identity.

FIG. 2 shows an example trusted user identity 200, comprising trusted identity information 210 and contact details 220. The trusted identity information 210 comprises a certificate signed by a Privacy CA with a signature 213, the certificate including a text identity label 211 and a public identity key 212. The contact details 220 suitably include information allowing a called party to contact the call originating user by various contact routes, such as e-mail addresses, postal addresses, telephone or fax numbers.

In use, the trusted user identity 200 is preferably supplied within a response 250 signed by the trusted platform module 12. Advantageously, by providing the trusted user identity 200 in a signed response 250, a called party has a high degree of confidence that the trusted user identity has been formed in a trusted manner.

Figure 3:
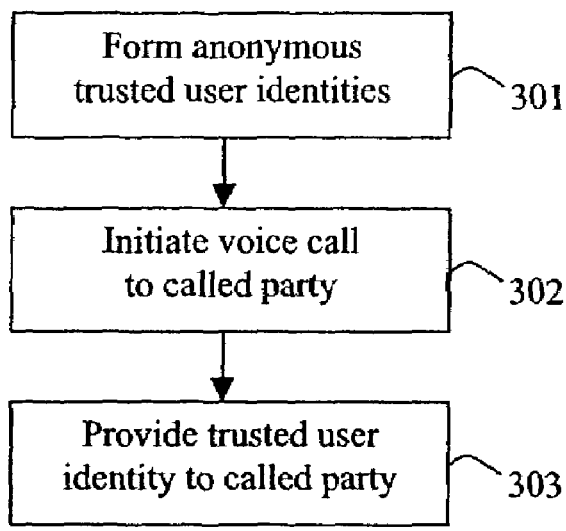
FIG. 3 shows a preferred method for use at a call originator apparatus for identifying a voice caller.

FIG. 3 shows a preferred method for use at the call originator apparatus 10 for identifying a voice caller.

In step 301 a trusted user identity 200 is formed at the call originator apparatus 10, ideally by using the trusted platform module 12. Optionally, one or more trusted user identities are formed and stored at the call originator apparatus in advance, and are then available for later use. Each identity includes a public identity key, which is one part of a public key and private key pair. The private key is retained by the call originator apparatus.

In step 302 the call originator apparatus 10 initiates a voice call to a called party apparatus 20 using a selected call transport mechanism. Call initiation includes, for example, routing a call through to the called party and initial handshaking. As specific examples, the call is routed using voice over IP standards, such as Session Initiation Protocol (SIP) or H.323.

Optionally, call initiation includes specifying that a trusted user identity 200 is available if desired by the called party.

Step 303 comprises providing a trusted user identity from the call originator apparatus to the called party apparatus. Suitably, at least one previously stored trusted user identity is available, and a selection is made amongst the available stored trusted user identities. Such a selection may depend, for example, on the context of the voice call (e.g. business or personal), or the nature of the called party. The selected trusted user identity is provided from the call originator apparatus to the called party apparatus, which allows the called party apparatus then to establish the identity of the caller in a reliable and trustworthy manner.

Figure 4:
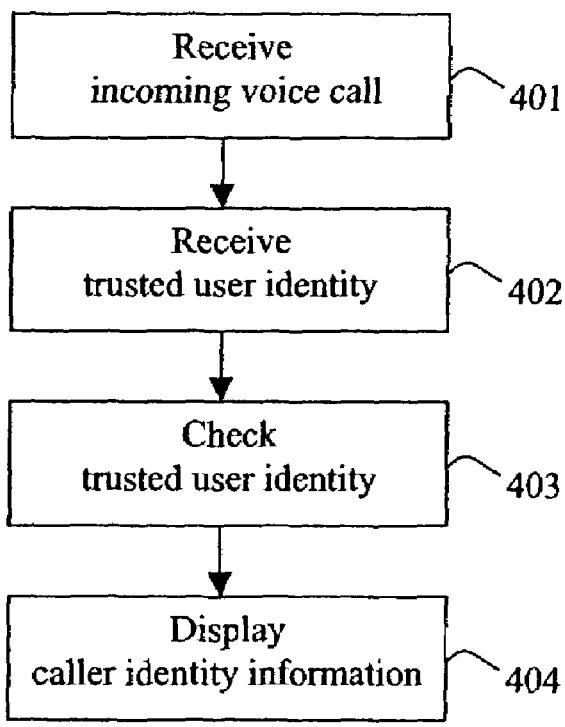
FIG. 4 shows a preferred method for use at a called party apparatus for identifying a voice caller.

FIG. 4 shows a method for use at the called party apparatus 20 for identifying a voice caller.

In step 401 an incoming voice call is received at the called party apparatus 20. Initial handshaking occurs such as required under SIP or H.323 standards, depending upon the nature of a call transport mechanism selected for the call. Optionally, the called party apparatus 20 may enquire whether a trusted user identity is available from the call originator apparatus, such as by making a challenge to the trusted platform module 12 of the call originator apparatus 10.

In step 402 the called party apparatus receives a trusted user identity from the call originator apparatus 10, such as by way of a response 250 signed by the trusted platform module 12.

In step 403 the received trusted user identity is checked. Firstly, the certificate from the Privacy-CA is checked for presence and format, and optionally the Privacy-CA's signature is checked such as by using a public signature-checking key made available by the Privacy-CA. The user text identity label and public identity key are then available to the called party. The public identity key is used, for example, to check data signed by the call originator apparatus with a corresponding private identity key. An asymmetric encryption algorithm, such as RSA, suitably generates the public key and private key. Only the call originator apparatus validly holds the secret private identity key, and the called party may then trust that the call originator apparatus does indeed correspond to the claimed identity. Other options are available to check the user identity, such as encrypting data using the public identity key, which can only be decrypted by the valid call originator apparatus using the private identity key.

Preferably, the called party apparatus indicates to a user that a trusted user identity has been received and checked, such as by a visual or audible signal.

Optionally, in step 404 information derived from the trusted user identity is displayed on the display 23 of the called party apparatus 20. Suitably, a text label contained within the trusted user identity is displayed on the display 23. Where additional personal details are available in the trusted user identity, such as contact details for the user, then suitably these are stored allowing a user of the called party apparatus to initiate a reply to the call originating user making use of these contact details.

The preferred voice call system and method and apparatus for identifying a voice caller described above have many advantages. A voice call is established in an inherently secure network such as an open computing network like the internet. The called party is able to establish identity of a voice caller in a reliable and trustworthy manner, by checking a trusted user identity. A chain of trust is established because the called party trusts the privacy certifying authority, and trusts the trusted platform module 12 of the call originator to provide accurate and reliable information. Subversion of the trusted platform module is very difficult. The call originator has the option of selecting amongst many available trusted user identities that can be used in different contexts. Further, these trusted user identities are optionally anonymous to avoid disclosing the real identity of the caller whilst still establishing that the caller has genuine characteristics. Other features and advantages will be apparent from the description herein.

The invention claimed is:

1. A method for identifying a voice caller, for use in a computing network arranged to carry a voice call from a call originating apparatus to a called party apparatus, the method comprising the steps of:

forming a user identity at the call originating apparatus, the user identity being a cryptographic identity according to an encryption algorithm; and initiating a IP telephony voice call, including supplying the user identity from the call originating apparatus to the called party apparatus, wherein the step of forming a user identity includes obtaining a signature from a privacy certifying authority.

2. The method of claim 1, comprising checking the signature at the called party apparatus using a signature checking key.

3. A call originating user apparatus arranged to originate a voice call over a computing network to a called party apparatus, the call originating user apparatus comprising:

a call unit arranged to initiate a voice call over the computing network; and an identity unit arranged to form a cryptographic user identity, and to provide the cryptographic user identity to the called party apparatus, wherein the identity unit is arranged to form a trusted user identity comprising an identity label, a public identity key formed as one part of an asymmetric encryption algorithm, and a signature obtained from a privacy certifying authority.

4. A call originating user apparatus arranged to originate a voice call over a computing network to a called party apparatus, the call originating user apparatus comprising:

a call unit arranged to initiate a voice call over the computing network; and an identity unit arranged to form a cryptographic user identity, and to provide the cryptographic user identity to the called party apparatus, wherein the identity unit comprises a TCPA trusted platform module and is arranged to form a trusted user identity comprising an identity label, and a public identity key, the public identity key being formed as one part of an asymmetric encryption algorithm.

5. A called party user apparatus arranged to receive a voice call from a call originating apparatus across a computing network, the called party user apparatus comprising:

a call unit arranged to receive an incoming voice call that includes a cryptographically-formed user identity; and a check unit arranged to cryptographically check the user identity to identify a voice caller, wherein the user identity comprises a user identity label, a public identity key, and a third-party signature, and the check unit is arranged to check the third-party signature using a signature checking key, cryptographically check the public identity key by interrogating the call originating apparatus, and then identify a voice caller with the user identity label.

* * * * *